US011519464B2

(12) United States Patent
Raszkowski et al.

(10) Patent No.: US 11,519,464 B2
(45) Date of Patent: Dec. 6, 2022

(54) PROFILED WHEEL RETAINER

(71) Applicant: Allison Transmission, Inc., Indianapolis, IN (US)

(72) Inventors: James Raszkowski, Indianapolis, IN (US); William S. Reed, Greenfield, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 538 days.

(21) Appl. No.: 16/442,764

(22) Filed: Jun. 17, 2019

(65) Prior Publication Data

US 2020/0393002 A1    Dec. 17, 2020

(51) Int. Cl.
| | |
|---|---|
| *F16D 1/116* | (2006.01) |
| *F16D 11/10* | (2006.01) |
| *F16H 63/30* | (2006.01) |
| *F16H 57/021* | (2012.01) |
| *F16H 57/00* | (2012.01) |

(52) U.S. Cl.
CPC ......... *F16D 11/10* (2013.01); *F16H 57/0031* (2013.01); *F16H 57/021* (2013.01); *F16H 63/30* (2013.01); *F16D 1/116* (2013.01); *F16H 57/0025* (2013.01)

(58) Field of Classification Search
CPC ...... F16H 57/0025; F16B 21/06; F16B 21/09; F16D 1/116
USPC .......................... 29/893.2; 411/522; 403/328
See application file for complete search history.

(56) References Cited

U.S. PATENT DOCUMENTS

| | | | | |
|---|---|---|---|---|
| 1,648,200 A | * | 11/1927 | Schulze | F16H 57/0025 403/333 |
| 1,803,136 A | * | 4/1931 | Schulze | F16D 1/092 403/253 |
| 2,237,465 A | * | 4/1941 | Zimmermann | F16D 1/06 403/18 |
| 3,826,024 A | * | 7/1974 | Petersen | E02F 9/2841 37/458 |
| 4,131,381 A | * | 12/1978 | Alberts | F16D 1/076 29/893.2 |
| 4,175,881 A | * | 11/1979 | Loos | F16D 1/06 403/13 |

(Continued)

FOREIGN PATENT DOCUMENTS

| | | |
|---|---|---|
| CN | 109350874 A | 2/2019 |
| WO | 2018/216783 A1 | 11/2018 |

OTHER PUBLICATIONS

Brushtec, "Pad Retaining Clips", Brushtec Innovative Brush Technology, Apr. 30, 2012, 3 pages.

(Continued)

*Primary Examiner* — William C Joyce
(74) *Attorney, Agent, or Firm* — Faegre Drinker Biddle & Reath LLP

(57) ABSTRACT

A profiled wheel assembly for coupling to a shaft includes a profiled wheel having a first guide slot extending radially outwardly from a central aperture of the profiled wheel and a first assembly slot spaced apart from and parallel to the first guide slot. A retainer is supported on the profiled wheel for movement between a lock position wherein the retainer axially locks the profiled wheel relative to the shaft and a release position wherein the retainer axially unlocks the profiled wheel relative to the shaft.

29 Claims, 13 Drawing Sheets

(56) References Cited

U.S. PATENT DOCUMENTS

| | | | |
|---|---|---|---|
| 4,505,058 A * | 3/1985 | Peterson | E02F 9/2841 |
| | | | 24/581.1 |
| 4,512,681 A | 4/1985 | Hayhurst et al. | |
| 5,094,117 A | 3/1992 | Mikel et al. | |
| 5,415,509 A | 5/1995 | Martin et al. | |
| 5,495,776 A | 3/1996 | Allen | |
| 5,636,935 A | 6/1997 | Beerens | |
| 6,415,491 B1 | 7/2002 | Klann | |
| 6,523,771 B2 | 2/2003 | Sumiyashiki | |
| 6,925,146 B2 | 8/2005 | Brauss | |
| 6,948,397 B1 * | 9/2005 | Oglesby | F16H 57/0025 |
| | | | 29/402.08 |
| 7,025,704 B2 | 4/2006 | Yasuda et al. | |
| 7,182,562 B2 | 2/2007 | Botosan et al. | |
| 7,219,571 B2 | 5/2007 | McCrary | |
| 7,390,068 B2 * | 6/2008 | Smith | A47L 9/009 |
| | | | 24/547 |
| 7,650,808 B2 | 1/2010 | Mizon et al. | |
| 7,681,825 B2 | 3/2010 | Sumiyashiki | |
| 8,038,218 B2 | 10/2011 | Wahls | |
| 8,316,730 B2 | 11/2012 | Matsumoto | |
| 8,820,343 B2 * | 9/2014 | Evertz | F16K 31/05 |
| | | | 137/15.17 |
| 9,964,160 B2 | 5/2018 | Palazzolo et al. | |
| 9,999,931 B2 | 6/2018 | Motschi et al. | |
| 10,066,743 B2 | 9/2018 | Pritchard et al. | |
| 2012/0167702 A1 | 7/2012 | Dangel | |
| 2017/0234408 A1 | 8/2017 | Thompson | |
| 2018/0355962 A1 | 12/2018 | Lahr et al. | |

OTHER PUBLICATIONS

IndiaMART, "Keyway Sprocket", Product Details, Mar. 2019, 9 pages.

Webike, "Monkey Racing Off-set Sprocket 4mm", Minimoto, Part No. 5108, Mar. 2019, 4 pages.

* cited by examiner

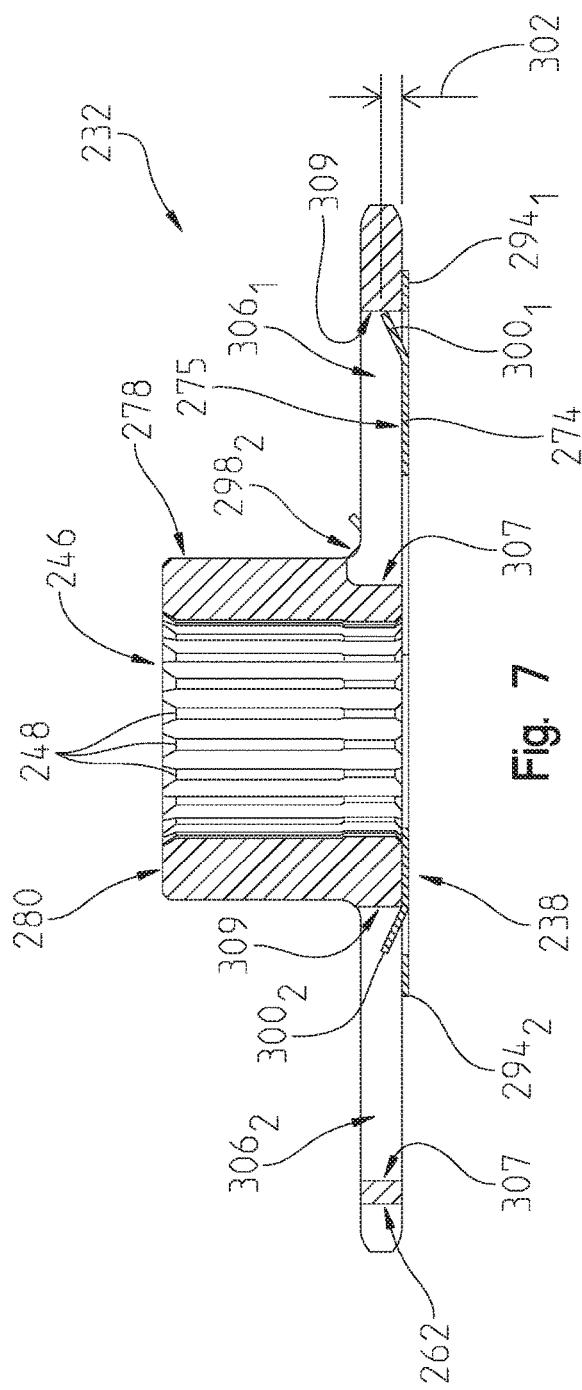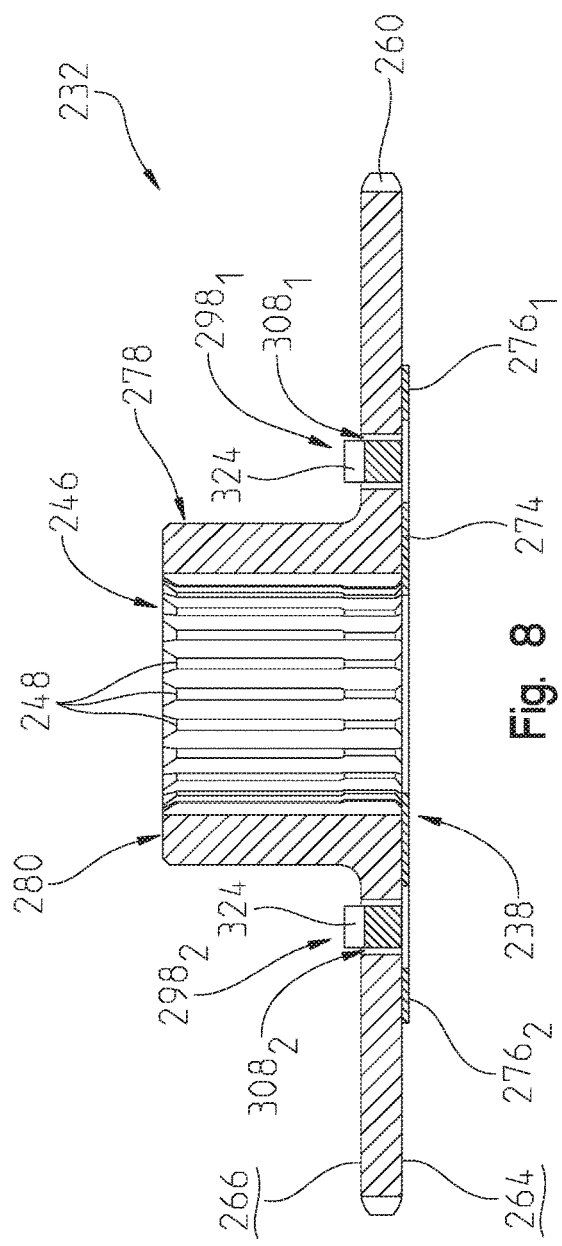

PROFILED WHEEL RETAINER

FIELD OF THE DISCLOSURE

The present disclosure relates to a profiled wheel assembly for coupling to a shaft and, in particular, to a retainer supportable by the profiled wheel and configured to selectively lock the profiled wheel relative to the shaft.

BACKGROUND OF THE DISCLOSURE

Known multi-speed transmissions include at least one operative component, such as a hydraulic fluid pump, utilized to operate other operative components of the multi-speed transmission, such as a selective coupler. The at least one operative component may receive power by an input shaft of the multi-speed transmission or a prime mover. Accordingly, the at least one operative component may include a shaft and a profiled wheel for receiving power from the input shaft of the multi-speed transmission. A power transmission belt may operatively couple the profiled wheel to the input shaft.

SUMMARY OF THE DISCLOSURE

In an exemplary embodiment of the present disclosure, a multi-speed transmission is disclosed. The transmission comprises an input member, an output member driven by the input member, a plurality of gears positionable to provide a plurality of gear ratios of the output shaft relative to the input shaft, and a profiled wheel having a disk-shaped body and engagement features extending radially outwardly from an outer perimeter of the body. The body includes an aperture and a first profiled wheel locator spaced apart from a second profiled wheel locator. The transmission also comprises a shaft received by the aperture of the profiled wheel, and the profiled wheel is removably coupled to the shaft for rotation with the shaft. The transmission further comprises a retainer supported for movement along a first side of the body of the profiled wheel. The retainer includes a base and a first retainer locator extending from the base, and the retainer is selectively moveable along the first side between a release position relative to the profiled wheel in which the base of the retainer is disengaged from the shaft and a lock position relative to the profiled wheel in which a portion of the base of the retainer engages the shaft to axially retain the profiled wheel on the shaft and the first retainer locator cooperates with the first profiled wheel locator to hold the retainer in the lock position. The first retainer locator is positioned on a second side of the body of the profiled wheel when the retainer is in the release position and when the retainer is in the lock position, and the second side of the profiled wheel is opposite the first side of the profiled wheel.

In another exemplary embodiment of the present disclosure, a profiled wheel assembly for coupling to a shaft is discloses. The profiled wheel assembly comprises a profiled wheel including a body with a central aperture and engagement features extending radially outwardly from an outer perimeter of the body, a first guide slot extending radially outwardly from the aperture, and a first assembly slot spaced apart from and parallel to the first guide slot. The profiled wheel assembly further comprises a retainer supportable by the profiled wheel. The retainer is positionable relative to the profiled wheel in a lock position wherein the retainer axially locks the profiled wheel relative to the shaft and a release position wherein the retainer axially unlocks the profiled wheel relative to the shaft. The retainer includes a base supported for movement along a first side of the body of the profiled wheel and a plurality of arms coupled to the base of the retainer and engageable with a second side of the profiled wheel to hold the retainer in at least one of the lock position and the release position.

In a further exemplary embodiment of the present disclosure, a profiled wheel assembly for coupling to a shaft is disclosed. The profiled wheel assembly comprises a profiled wheel having a disk-shaped body and engagement features extending radially outwardly from an outer perimeter of the body. The body includes an aperture and a first profiled wheel locator spaced apart from a second profiled wheel locator. The profiled wheel assembly further comprises a retainer supported for movement along a first side of the body of the profiled wheel. The retainer includes a base and a first retainer locator extending from the base. The retainer is positionable relative to the profiled wheel in a lock position wherein the retainer axially locks the profiled wheel relative to the shaft and the first retainer locator cooperates with the first profiled wheel locator to hold the retainer in the lock position and a release position wherein the retainer axially unlocks the profiled wheel relative to the shaft and the first retainer locator cooperates with the second profiled wheel locator to hold the retainer in the release position.

In another exemplary embodiment of the present disclosure, a retainer for supporting on a profiled wheel is disclosed. The retainer comprises a base having an elongated aperture with a first diameter and a second diameter larger than the first diameter, a first guide prong extending from the base and collinear with the elongated aperture of the base, and a plurality of arms extending from the base. The plurality of arms are positioned parallel to the first guide prong and the elongated aperture.

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 4a is a front perspective view of the retainer and profiled wheel of FIG. 3a;

FIG. 4b is a rear perspective view of the retainer and profiled wheel of FIG. 3a;

FIG. 5 is a bottom assembly view of the retainer and profiled wheel of FIG. 3a;

FIG. 6 is a top assembly view of the retainer and profiled wheel of FIG. 3a;

FIG. 7 is a cross-sectional view of the retainer and profiled wheel taken along lines 7-7 of FIG. 4b;

FIG. 8 is a cross-sectional view of the retainer and profiled wheel taken along lines 8-8 of FIG. 4b;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
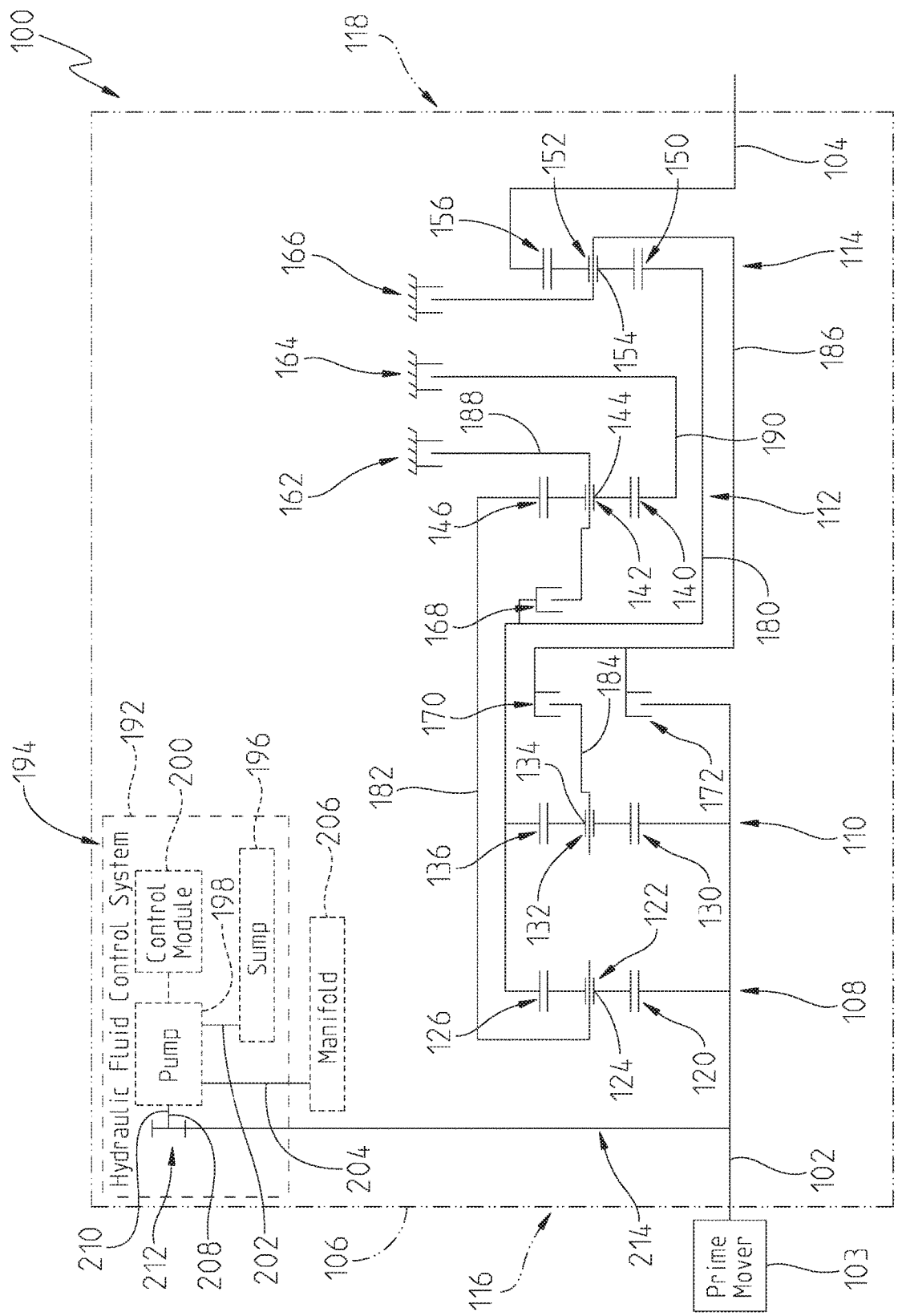
FIG. 1 is a diagrammatic view of an exemplary multi-speed transmission including four planetary gearsets, six selective couplers, and eight interconnectors.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the exemplary transmission embodiment, torque and rotational motion are transferred from an input member to an output member through a multi-speed transmission. In order to facilitate the transfer of torque and rotational motion to the output member at different selected gear ratios, the multi-speed transmission includes a plurality of operative transmission components. Simply put, an operative transmission component is a device or component that carries torque and rotational motion within the transmission. One or more parts of the operative transmission component may be rotatable to form a rotatable transmission component. Operative transmission components illustratively include selective couplers, interconnectors, sun gears, planet carrier assemblies, and ring gears.

A clutch is an example of a selective coupler. A clutch couples two or more rotating components to one another so that the two or more rotating components rotate together as a unit in an engaged configuration and permits relative rotation between the two or more rotating components in a disengaged configuration. Exemplary clutches may be shiftable friction-locked multi-disk clutches, shiftable form-locking claw or conical clutches, wet clutches, or any other known form of a clutch. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A second exemplary selective coupler is a brake. A brake couples one or more rotatable components to a stationary component to hold the one or more rotatable components stationary relative to the stationary component in an engaged configuration and permits rotation of the one or more components relative to the stationary component in a disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in U.S. Pat. No. 9,625,007, the entirety of which is incorporated by reference.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, fasteners, welding, machined or formed functional portions of a unitary piece, interference fit connections, or other suitable methods of connecting components.

Interconnectors include one or more rotating components, such as shafts, drums, and other components fixedly coupled together. Interconnectors may further be fixedly coupled to one or more other operative transmission components.

FIG. 1 is a diagrammatic representation of an exemplary multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. Input member 102 is rotated by a prime mover 103. Exemplary prime movers 103 include internal combustion engines, electric motors, hybrid power systems, and other suitable power systems. In one embodiment, prime mover 103 indirectly rotates input member 102 through a clutch and/or a torque converter. An exemplary output member 104 is an output shaft or other suitable rotatable component. Output member 104 provides rotational power to one or more working components. Exemplary working components include one or more drive wheels of a motor vehicle, a power take-off shaft, and other suitable devices. Output member 104 is rotated based on the interconnections of the operative transmission components of the transmission 100. By changing the interconnections of the operative transmission components, a rotation speed of output member 104 may be varied from a rotation speed of input member 102. An exemplary stationary member 106 is a housing of multi-speed transmission 100. The housing may include several components coupled together. In the exemplary embodiment shown in FIG. 1, input member 102 enters stationary member 106 at a first location or end 116 and output member 104 exits stationary member 106 at a second location or end 118. As a result, second end 116 of stationary member 106 is positioned adjacent prime mover 103 in FIG. 1.

Multi-speed transmission 100 includes at least one planetary gearset. In the exemplary embodiment of FIG. 1, multi-speed transmission 100 includes a plurality of planetary gearsets, illustratively a first planetary gearset 108, a second planetary gearset 110, a third planetary gearset 112, and a fourth planetary gearset 114. In another embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments. Additionally, the arrangement of the plurality of planetary gearsets is exemplary.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162, second selective coupler 164, and third selective coupler 166 are brakes and fourth selective coupler 168, fifth selective coupler 170, and sixth selective coupler 172 are clutches. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108 and sun gear 130 of second planetary gearset 110. Output member 104 is fixedly coupled to ring gear 156 of fourth planetary gearset 114. Ring gear 126 of first planetary gearset 108, ring gear 136 of second planetary gearset 110, and sun gear 150 of fourth planetary gearset 114 are fixedly coupled together. Planet carrier 122 of first planetary gearset 108 is fixedly coupled to ring gear 146 of third planetary gearset 112. In alternative embodiments, one or more of the components fixedly coupled together are selectively coupled together through one or more selective couplers.

Multi-speed transmission 100 may be described as having eight interconnectors. Input member 102 is a first interconnector that both provides input torque and rotational motion to multi-speed transmission 100 and fixedly couples sun gear 120 of first planetary gearset 108 to sun gear 130 of second planetary gearset 110. Input member 102 is further fixedly coupled to sixth selective coupler 172. Output member 104 is a second interconnector that provides output torque and rotational motion from multi-speed transmission 100. A third interconnector 180 fixedly couples ring gear 126 of first planetary gearset 108, ring gear 136 of second planetary gearset 110, and sun gear 150 of fourth planetary gearset 114 together. Third interconnector 180 is further fixedly coupled to fourth selective coupler 168. A fourth interconnector 182 fixedly couples planet carrier 122 of first planetary gearset 108 to ring gear 146 of third planetary gearset 112. A fifth interconnector 184 fixedly couples planet carrier 132 of second planetary gearset 110 to fifth selective coupler 170. A sixth interconnector 186 fixedly couples planet carrier 152 of fourth planetary gearset 114, third selective coupler 166, fifth selective coupler 170, and sixth selective coupler 172 together. A seventh interconnector 188 fixedly couples planet carrier 142 of third planetary gearset 112 to first selective coupler 162 and to fourth selective coupler 168. An eighth interconnector 190 fixedly couples sun gear 140 of third planetary gearset 112 to second selective coupler 164. Each interconnector may include multiple components that are fixedly coupled together.

Multi-speed transmission 100 further includes several components that are illustratively shown as being selectively coupled together through selective couplers. By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together. Thus, the plurality of planetary gearsets and the plurality of selective couplers of multi-speed transmission 100 may be interconnected in various arrangements to provide torque and rotational motion from input member 102 to output member 104 in a plurality of forward gear or speed ratios and reverse gear or speed ratios. FIG. 1 is a representative view of an exemplary transmission. Additional details regarding the exemplary transmission are disclosed in U.S. patent application Ser. No. 15/483,027, the entirety of which is incorporated by reference.

Multi-speed transmission 100 further includes a hydraulic fluid control system 192 supported by stationary member 106. More specifically, fluid control system 192 is supported within an oil pan 194 of the housing of stationary member 106. In one embodiment, oil pan 194 may be removably coupled to stationary member 106. Fluid control system 192 illustratively includes a sump 196, a pump 198 in fluid communication with sump 196, and a control module 200 operatively coupled to pump 198. Sump 196 is defined by an interior of oil pan 194 and contains a hydraulic fluid. Suitable hydraulic fluids include automatic transmission fluid ("ATF"). Illustratively, ATF includes transmission fluids ranging from SAE 90W to engine motor oil as well as low and ultra-low viscosity transmission fluids.

Pump 198 includes an intake or pickup 202 positioned within and in fluid communication with sump 196. In the exemplary embodiment shown, pump 198 comprises a positive displacement pump such as, for example, a rotary-type positive displacement pump having an internal gear or vane. An output 204 of pump 198 is fluidly coupled to a distribution manifold 206 of the fluid control system 192. Distribution manifold 206 may include one or more solenoid valves and is fluidly coupled to each of first selective coupler 162, second selective coupler 164, third selective coupler 166, fourth selective coupler 168, fifth selective coupler 170, and sixth selective coupler 172. Pump 198 further includes an input member 208, illustratively a shaft 210, having a profiled wheel 212 supported thereon. Profiled wheel 212 is operatively coupled to input member 102 of transmission 100 using a power transmission belt 214. Transmission belt 214 may comprise, for example, a roller chain, a v-belt, a multi-groove belt, a synchronous belt, a ribbed belt, or other specialty belt. In other embodiments, profiled wheel 212 of pump 198 is directly or indirectly coupled to input member 102 of transmission 100 using a gear train or a combination thereof.

During operation of transmission 100, power is transferred from input member 102 of transmission 100 to shaft 210 of pump 198. More specifically, shaft 210 of pump 198 rotates so long as and at the same rotational speed as input member 102. In other embodiments, the rotational speed of pump 198 may be stepped up or down from the rotational speed of input member 102; that is, the rotational speed of shaft 210 of pump 198 may be faster or slower than the rotational speed of input member 102.

Rotation of shaft 210 results in an intake of hydraulic fluid from sump 196 via pickup 202. Pump 198 pressurizes and discharges the hydraulic fluid through output 204 and into distribution manifold 206. Control module 200 includes an assembly of valves, hydraulic fluid tracking bodies, springs, and solenoid valves. In the exemplary embodiment shown, control module 200 cooperates with distribution manifold 206 to selectively route the pressurized hydraulic fluid from distribution manifold 206 to each of first selective coupler 162, second selective coupler 164, third selective coupler 166, fourth selective coupler 168, fifth selective coupler 170, and sixth selective coupler 172. The pressurized hydraulic fluid is used to transition a respective one of first selective coupler 162, second selective coupler 164, third selective coupler 166, fourth selective coupler 168, fifth selective coupler 170, and sixth selective coupler 172 from a first configuration to a second configuration, illustratively from the disengaged configuration to the engaged configuration. Control module 200 and distribution manifold 206 route the pressurized hydraulic fluid to the selective couplers as needed for each of the forward and reverse speed ratios. Distribution manifold 206 also routes the pressurized hydraulic fluid where needed for lubrication.

Figure 2:
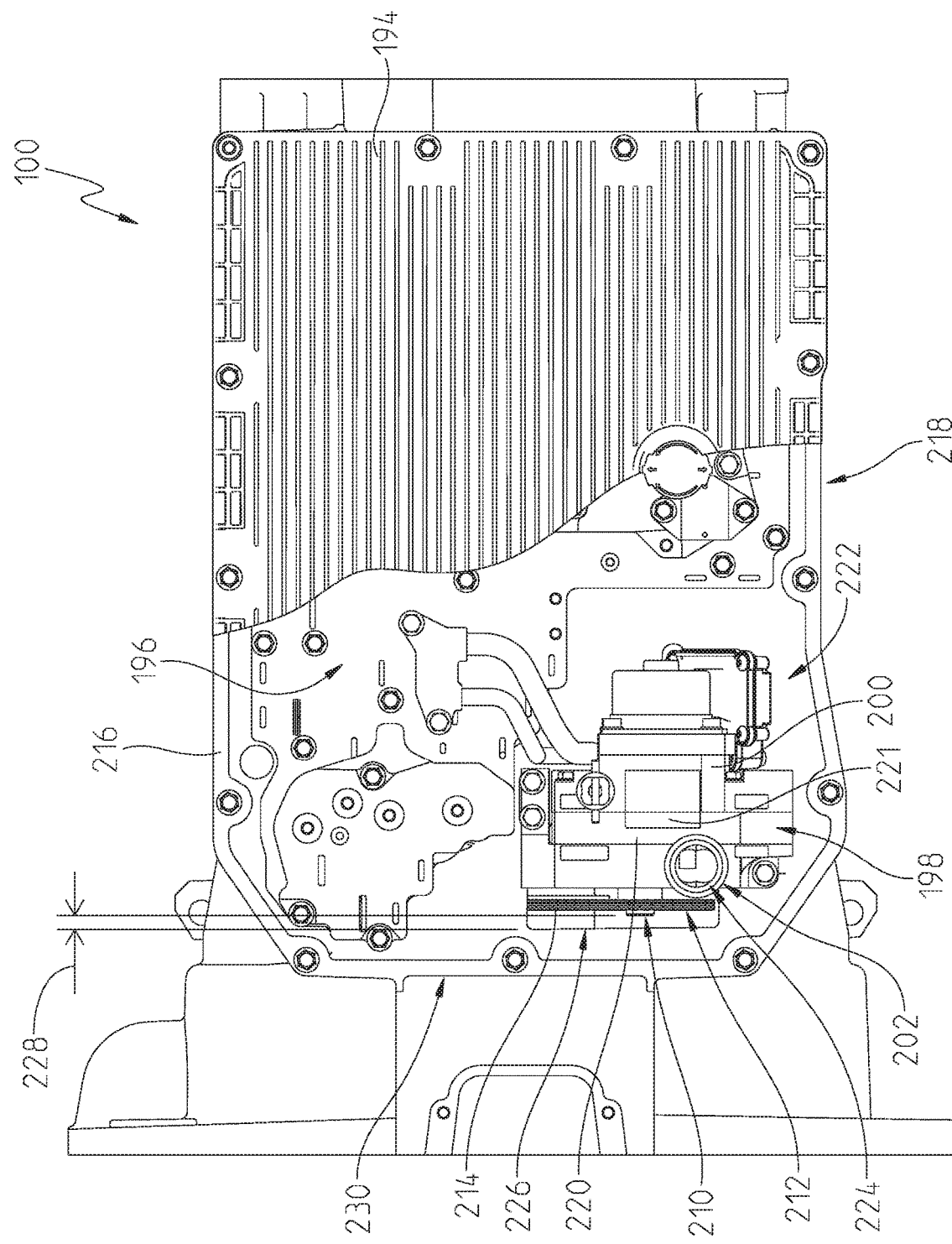
FIG. 2 is a partial cutaway view of a bottom of an exemplary multi-speed transmission.

Turning now to FIG. 2, a bottom view of an exemplary embodiment of transmission 100 is shown. Oil pan 194 illustratively couples to a mounting flange 216 of a housing 218 of stationary member 106. In the exemplary embodiment shown, a housing 220 of pump 198 is supported within a lower portion 222 of housing 218 open to sump 196. Housing 220 of pump 198 includes an opening 224 defining pickup 202 and supports a motor 221 drivingly coupled to shaft 210, which extends from housing 220. Control module 200 is coupled to pump 198 opposite profiled wheel 212. Illustratively, when profiled wheel 212 is supported on shaft 210 of pump 198, profiled wheel 212 is positioned intermediate housing 220 of pump 198 and a wall 226 of housing 220. A lower portion 230 of wall 226 defines mounting flange 216. In addition, a space or gap 228 is defined between shaft 210 and wall 226. Gap 228 is sufficiently sized to permit the removal of profiled wheel 212 from shaft 210 when replacing profiled wheel 212, transmission belt 214, or pump 198. In the exemplary embodiment shown, gap 228 is 11.7 mm. In other embodiments, gap 228 may be smaller or larger than 11.7 mm.

Figure 3A:
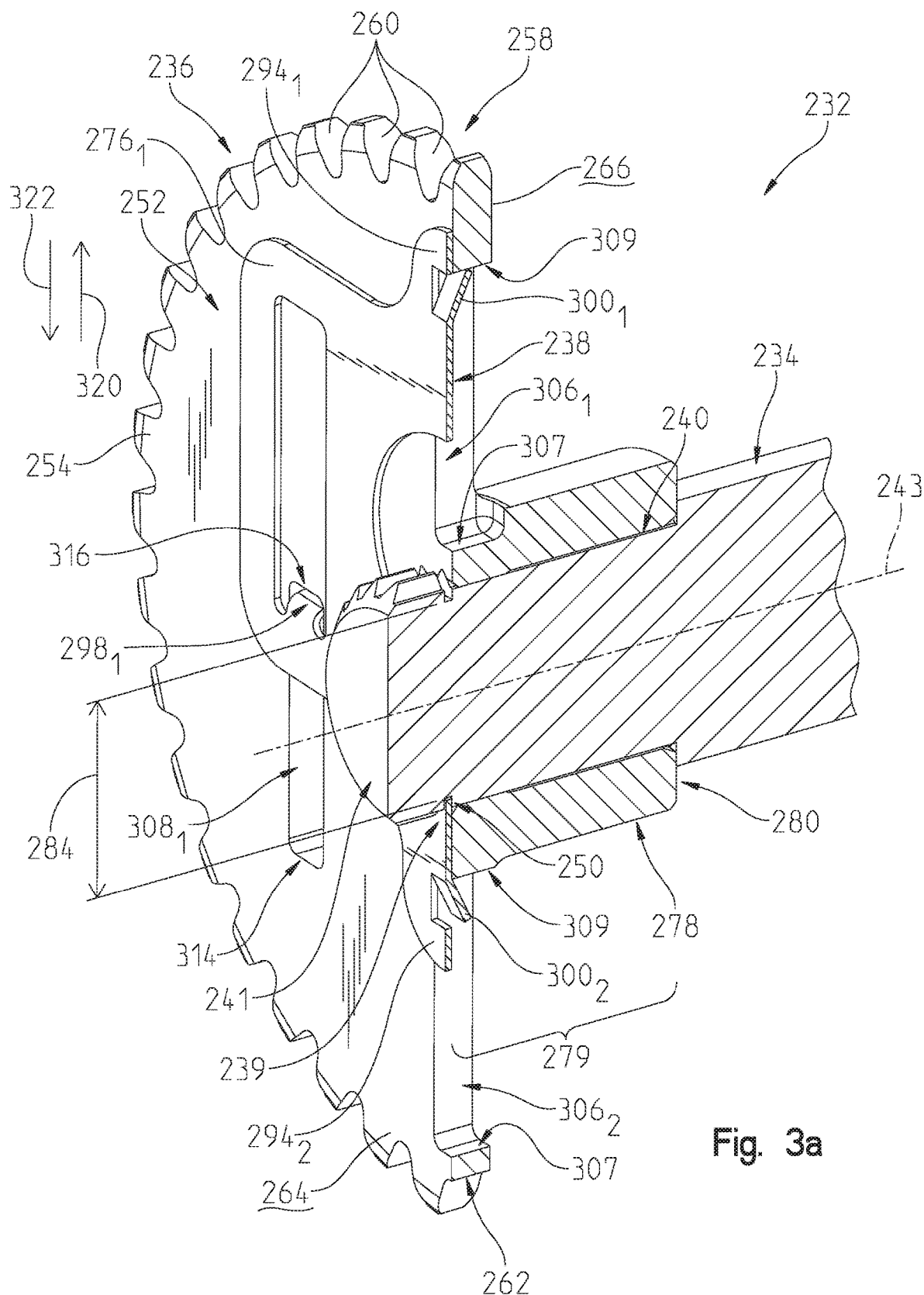
FIG. 3a is a perspective cross-sectional view of an exemplary retainer supported on an exemplary profiled wheel, the profiled wheel axially retained on a shaft.
Figure 3B:
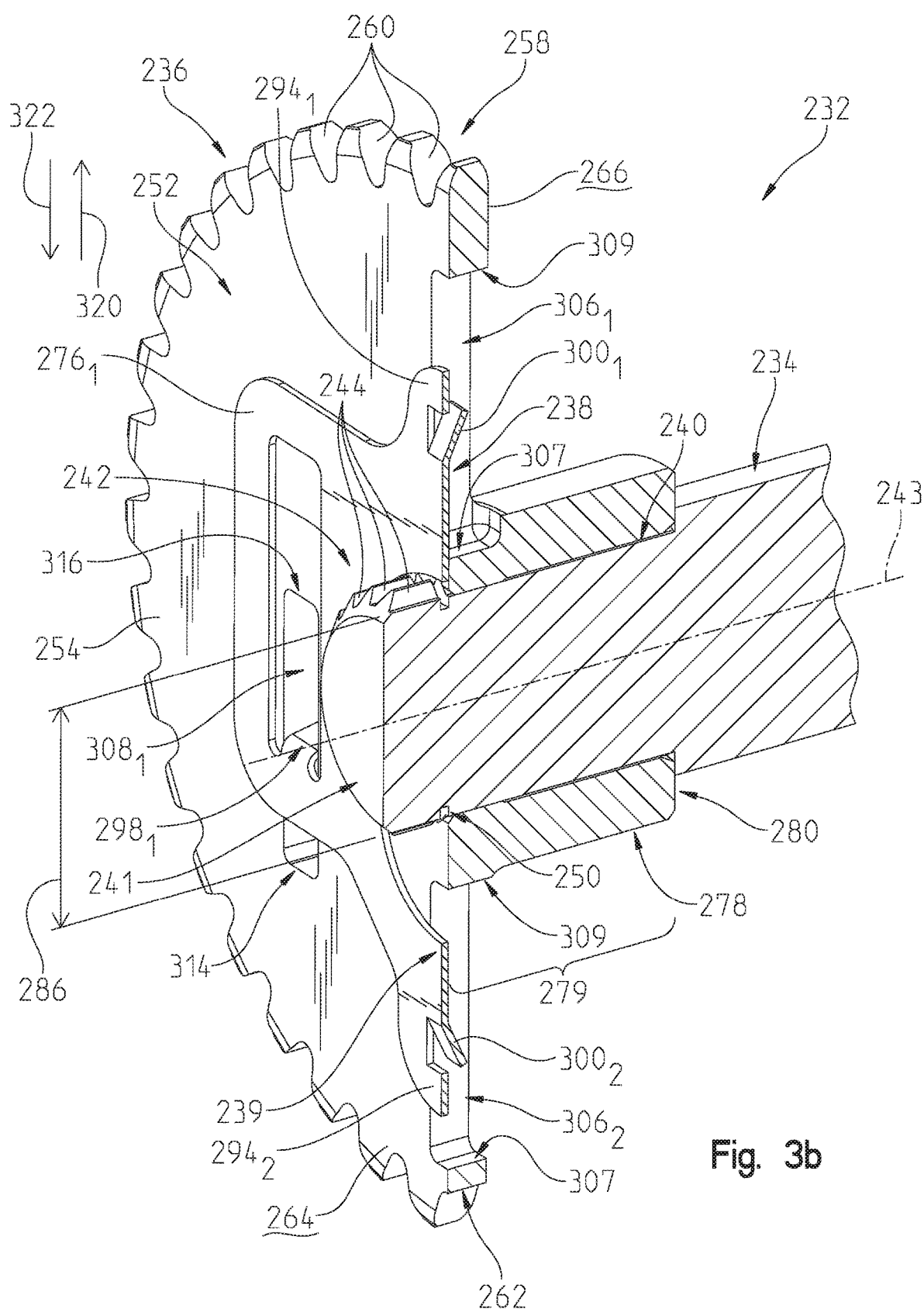
FIG. 3b is a perspective cross-sectional view of the retainer supported on the profiled wheel of FIG. 3a, the profiled wheel axially loose on the shaft.

Referring now to FIGS. 3a and 3b, a profiled wheel assembly 232 removably coupled to a shaft 234 is shown in more detail. Profiled wheel assembly 232 illustratively includes an exemplary profiled wheel 236 and a retainer 238 for selectively axially retaining profiled wheel 236 to shaft 234. Shaft 234 illustratively includes a bearing portion 240 on which profiled wheel 236 is received. Bearing portion 240 illustratively extends axially from a first end 241 of shaft 234 along a longitudinal axis 243 of shaft 234. Bearing portion 240 of shaft 234 includes a plurality of engagement features 242, illustratively splines 244, configured to engage complementary engagement features 246, illustratively splines 248, of profiled wheel 236 (see FIGS. 7 and 8) When engagement features 242 of shaft 234 are engaged with engagement features 246 of profiled wheel 236, profiled wheel 236 is fixedly coupled to shaft 234 such that profiled wheel 236 and shaft 234 rotate together about longitudinal axis 243, but profiled wheel 236 is removably coupled to shaft 234 along longitudinal axis 243.

In the exemplary embodiment shown, splines 244 extend parallel to longitudinal axis 243 of shaft 234 and axially align profiled wheel 236 with shaft 234. Retainer 238 is supported for selective movement along profiled wheel 236 between a lock position relative to profiled wheel 236 in which a portion 239 of retainer 238 is received within a circumferentially extending groove 250 to axially retain profiled wheel 236 on shaft 234 (FIG. 3a) and a release position relative to profiled wheel 236 in which retainer 238 is disengaged from groove 250 and retainer 238 may be axially removed from shaft 234 (FIG. 3b).

Turning now to FIGS. 4a-6, profiled wheel assembly 232 is shown in more detail. Profiled wheel 236, illustratively a sprocket 252, comprises a disk-shaped body 254 having a central aperture 256 and a plurality of engagement features 258, illustratively cogs 260, extending radially outwardly from an outer perimeter 262 of body 254 of profiled wheel 236. In the exemplary embodiment shown, cogs 260 are configured to engage belt 214. In other embodiments, profiled wheel 236 comprises a gear having gear teeth extending radially outwardly from outer perimeter 262 of body 254 for engaging complementary gear teeth of input member 102 or an intermediate shaft or gear thereof.

Figure 4A:
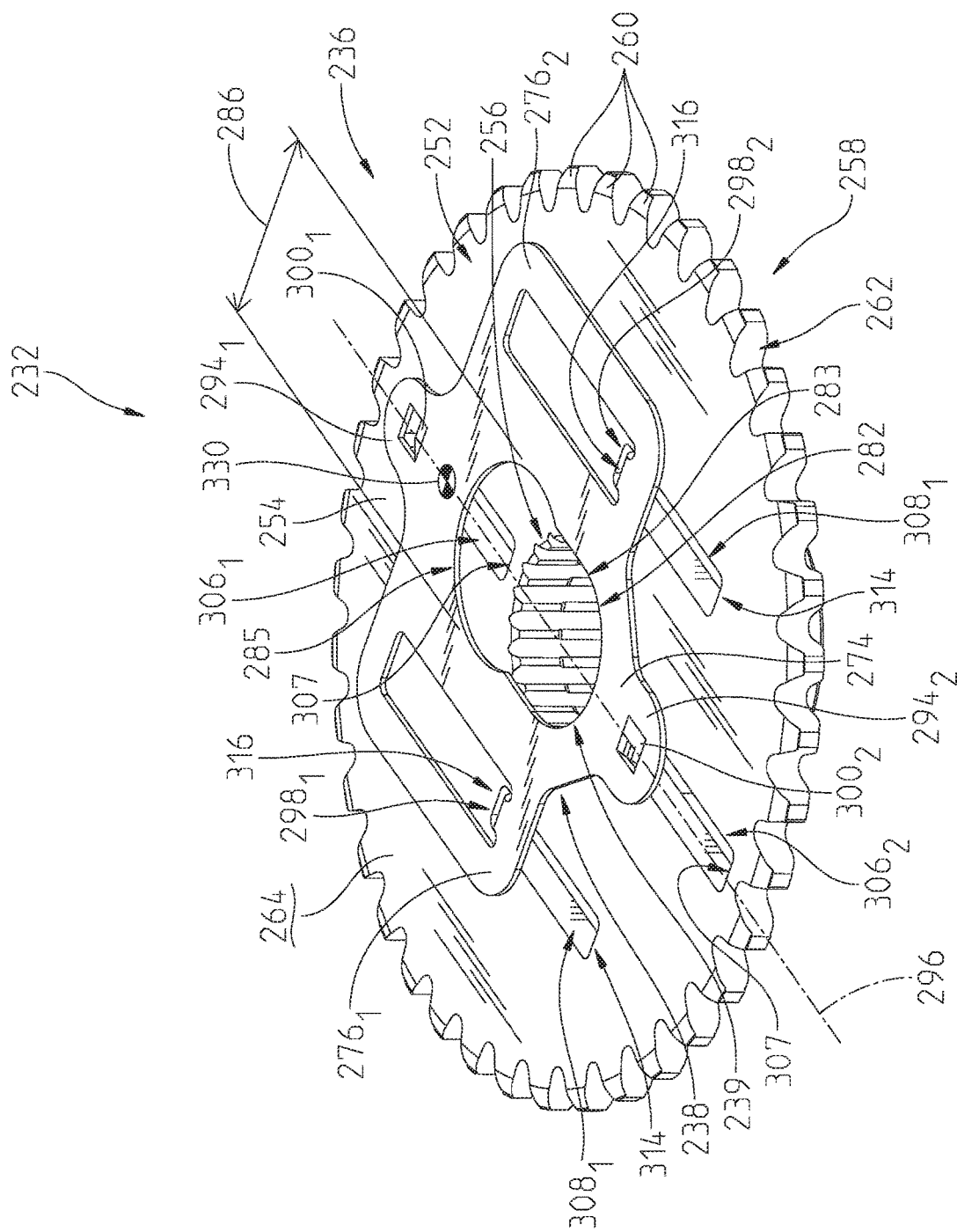
Figure 4B:
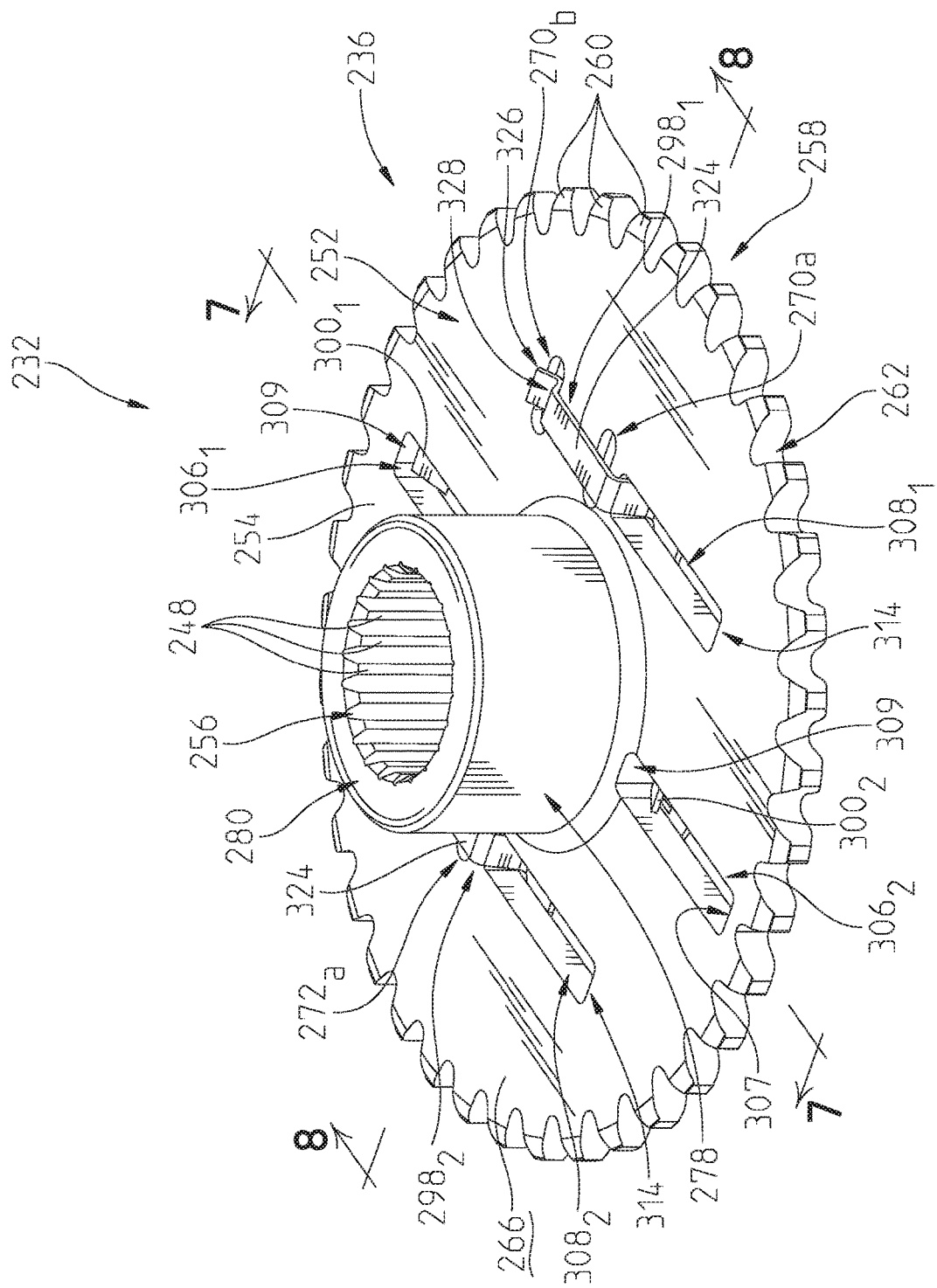
Figure 5:
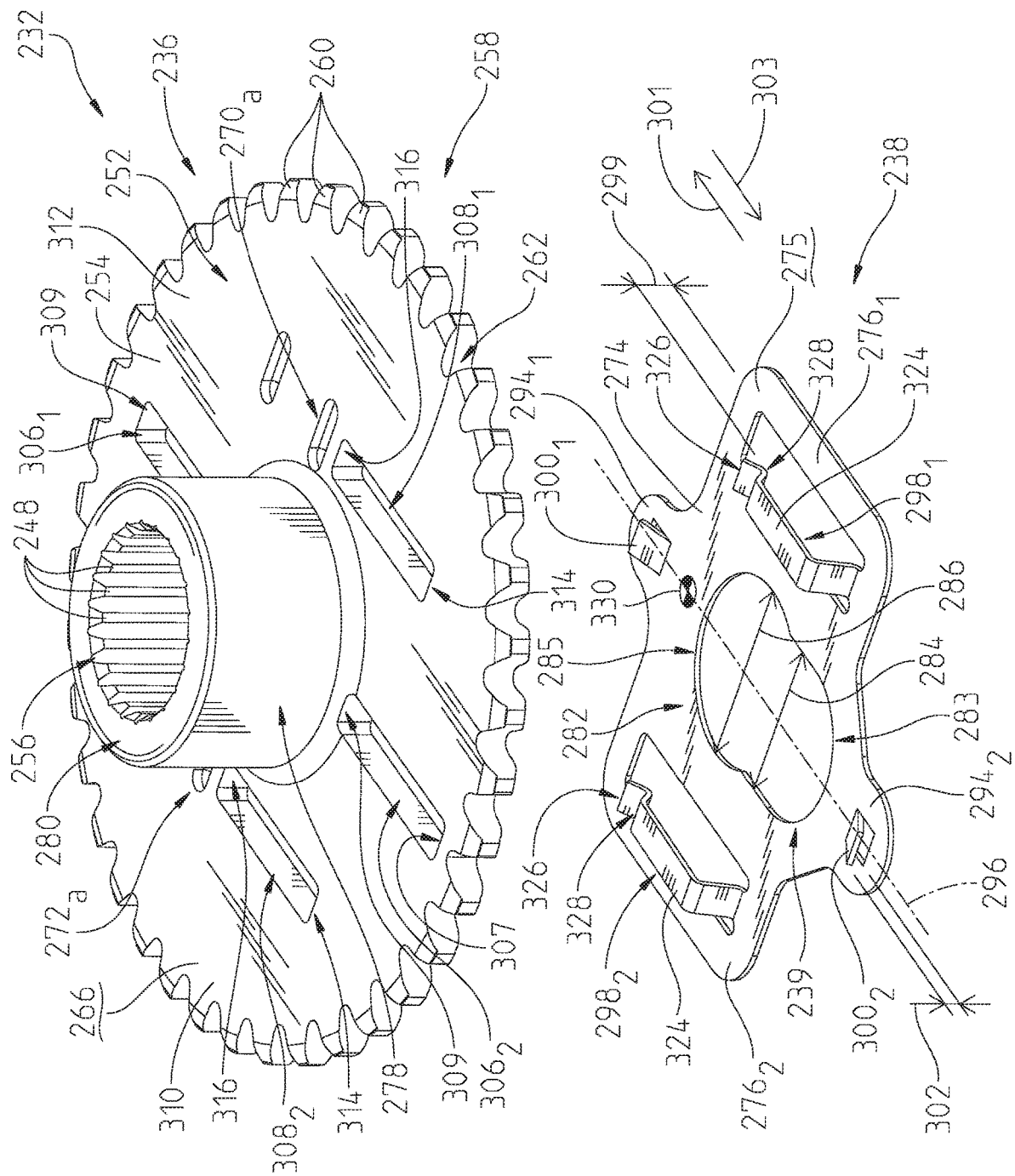

Body 254 includes a first side 264 and a second side 266 opposite first side 264. Side 266 of profiled wheel 236 includes a first pair of profiled wheel detents or locators 270, illustratively locators $270a$, $270b$, spaced apart from a second pair of profiled wheel detents or locators 272, illustratively locators $272a$, $272b$ (see FIG. 11). In the exemplary embodiment shown, locators 270, 272 comprise indents in second side 266 of body 254 of profiled wheel 236. In other embodiments, locators 270, 272 comprise protrusions. Referring specifically to FIGS. 4b and 5, a collar 278 extends outwardly from side 266 of body 254 to a distal end 280. Collar 278 surrounds and is coaxial with central aperture 256 of profiled wheel 236. When profiled wheel 236 is mounted on shaft 234, collar 278 overlaps at least a portion 279 of bearing portion 240 of shaft 234. Accordingly, engagement features 246 of central aperture 256 and collar 278 extend from side 264 of profiled wheel 236 to distal end 280 (see FIGS. 7 and 8).

Retainer 238 includes a base 274 having an elongated aperture 282. Elongated aperture 282 includes a first portion 283 having a first diameter 284 and a second portion 285 having a second diameter 286. Diameter 284 corresponds to an outer diameter 288 of shaft 234 at groove 250 (see FIG. 3a). Conversely, diameter 286 is larger than diameter 284 and corresponds to an inner diameter of central aperture 256 of profiled wheel 236 sufficient to facilitate alignment and engagement of engagement features 242, 246 when profiled wheel 236 is mounted on shaft 234 (see FIG. 3b).

In the exemplary embodiment shown, retainer 238 is supported for movement along side 264 of profiled wheel 236. To this end, base 274 includes wings 276, illustratively wings $276_1$, $276_2$, positioned on opposite sides of elongated aperture 282. A plurality of arms or retainer locators 298, illustratively arms $298_1$, $298_2$ extend generally upwardly and outwardly from base 274. More specifically, retainer locator $298_1$ extends upwardly and outwardly from wing $276_1$ of base 274, and retainer locator $298_2$ extends upwardly and outwardly from wing $276_2$ of base 274. Retainer locators 298 extend upwardly from their respective wing 276 to a height 299 relative to a side 275 of base 274. Illustratively, retainer locators $298_1$, $298_2$ extend parallel to a longitudinal axis 296 of elongated aperture 282 in a direction 301.

Body 274 of retainer 238 further includes a plurality of guide tabs 294, illustratively tabs $294_1$, $294_2$, positioned on opposite sides of elongated aperture 282. More specifically, guide tabs 294 are collinear with and intersected by longitudinal axis 296 of elongated aperture 282. Extending upwardly from tabs 294 is a respective guide prong 300.

More specifically, a guide prong $300_1$ extends upwardly and in first direction 301 from tab $294_1$, and a guide prong $300_2$ extends upwardly and in a second direction 303 from tab $294_2$ opposite direction 301. As a result, guide prong $300_1$ is collinear with guide prong $300_2$ and is parallel to retainer locators $298_1$, $298_2$. In addition, guide prongs 300 extend upwardly from their respective tab 294 to a height 302 relative to side 275 of base 274. Height 299 of retainer locators 298 is higher than height 302 of guide prongs 300 relative to side 275 of base 274.

Figure 6:
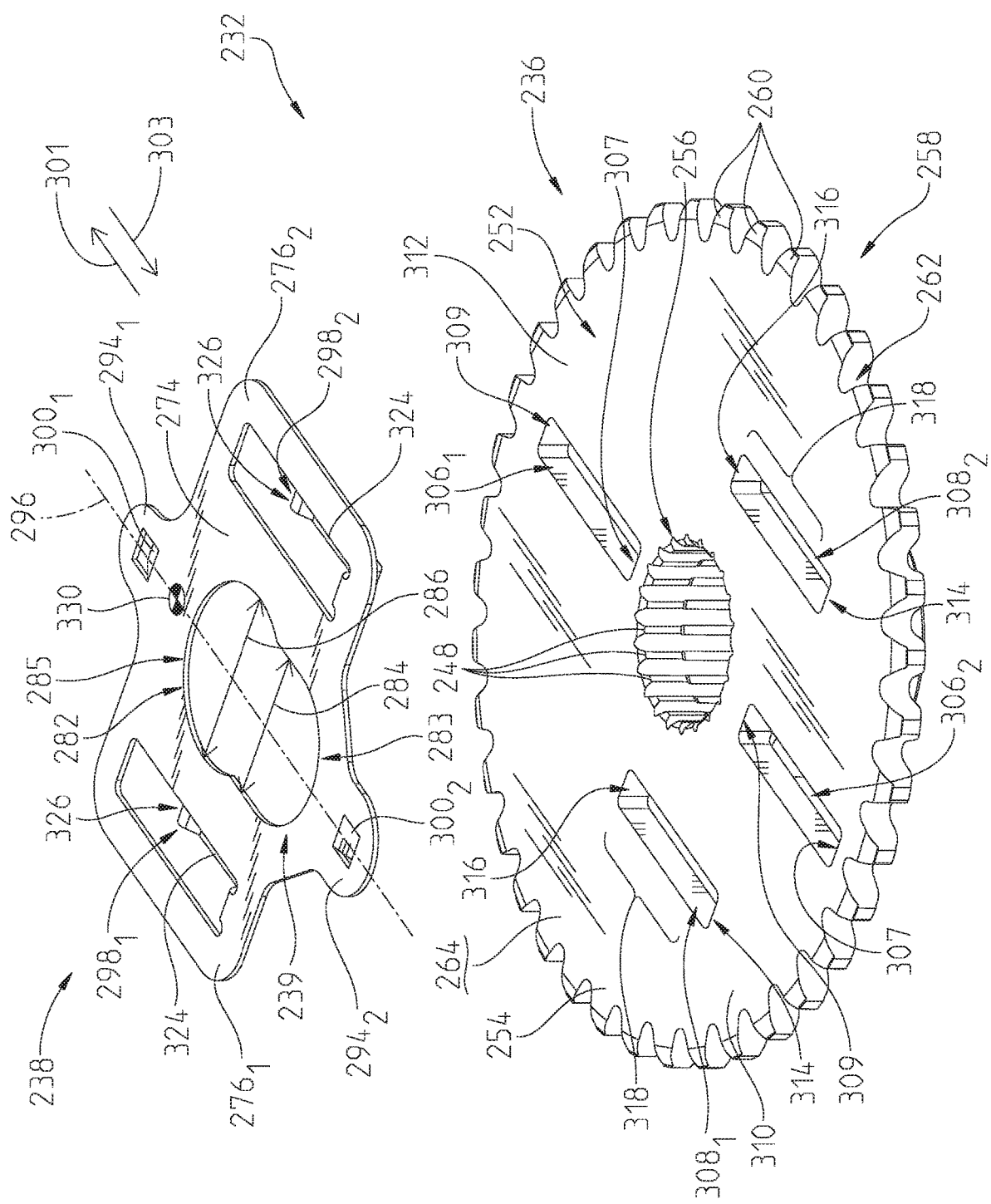

To support movement of retainer 238 along side 264 of profiled wheel 236, body 254 includes a plurality of channels or slots configured to receive a respective one of retainer locators 298 and guide prongs 300. Specifically, body 254 includes guide slots 306, illustratively guide slots $306_1$, $306_2$. As shown in FIG. 6, guide slots 306 extend radially outwardly from central aperture 256 towards outer perimeter 262. Illustratively, guide slots 306 extend from a first end 307 to a second end 309 and are positioned radially intermediate central aperture 256 and outer perimeter 262. Moreover, guide slots 306 are formed in body 254 of profiled wheel 236 from first side 264 to second side 266, as shown in FIG. 7. In other embodiments, guide slots 306 comprise depressions in one of sides 264, 266 that do not extend fully to the other side of body 254.

Body 254 also includes assembly slots 308, illustratively assembly slots $308_1$, $308_2$. As shown in FIG. 6, assembly slots 308 are arranged on opposite sides of central aperture 256 and guide slots 306. More specifically, assembly slot 3081 is positioned on a first side of central aperture 256 and extends parallel to guide slots 306, and assembly slot $308_2$ is positioned on a second side of central aperture 256 and extends parallel to guide slots 306 and slot assembly 3081. Illustratively, assembly slots 308 and guide slot $306_2$ are positioned on a first portion 310 of body 254. Conversely, guide slot $306_1$ is positioned on a second portion 312 of body 254. On first portion 310 of body 254, assembly slots 308 extend non-radially from a first end 314 proximate outer perimeter 262 to a second end 316 proximate central aperture 256. As a result, assembly slots 308 overlap at least a portion 318 of central aperture 256. In addition, locators 270, 272 are positioned on second portion 312 of body 254. Specifically, locator 270a is positioned proximate second end 316 of assembly slot $308_1$, and locator 272a is positioned proximate second end 316 of assembly slot $308_2$. Locator 270b is spaced apart from locator 270a and collinear with assembly slot $308_1$, and locator 272b is spaced apart from locator 272a and collinear with assembly slot $308_2$.

Figure 9:
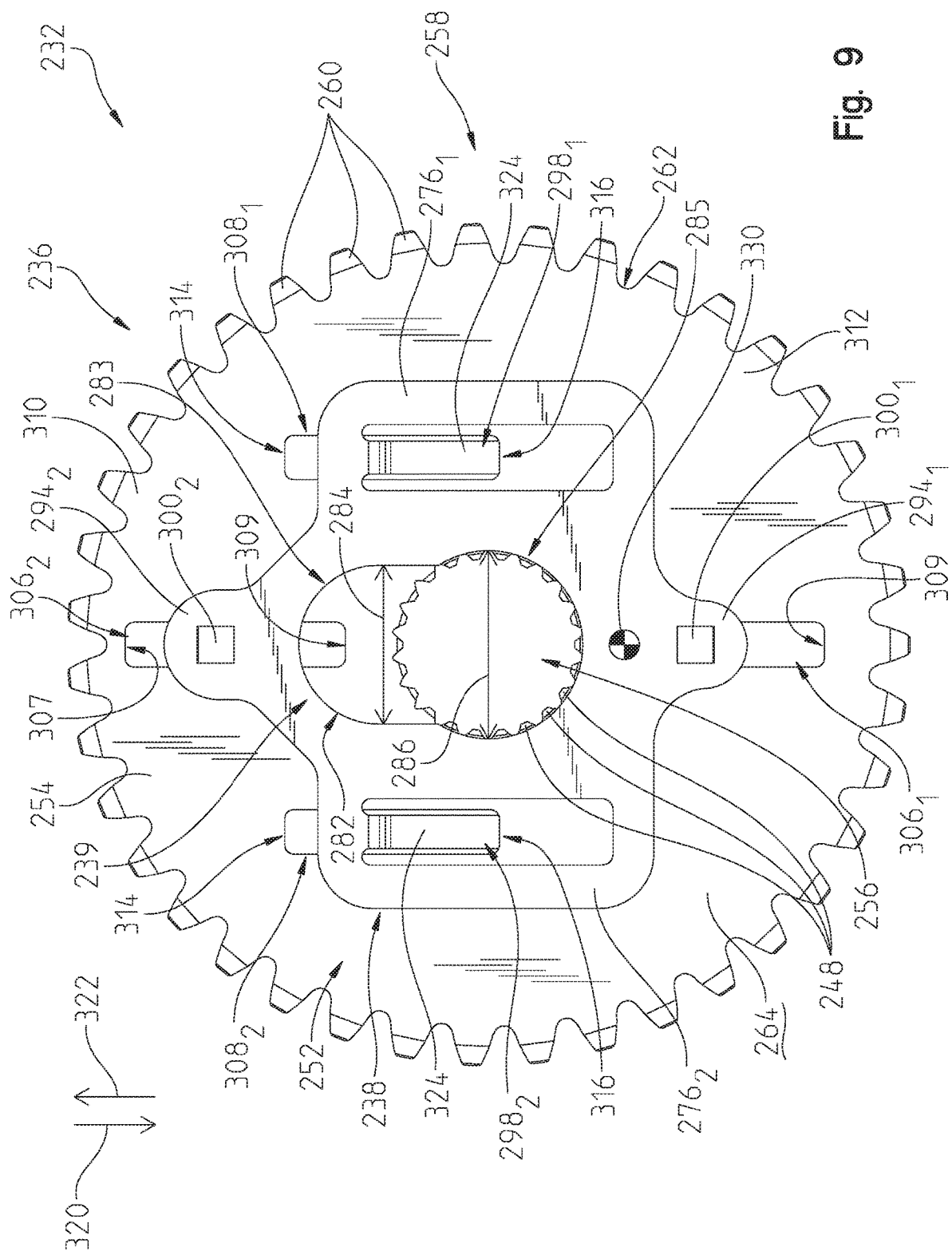
FIG. 9 is a front view of the retainer supported on the profiled wheel in a release position.
Figure 10:
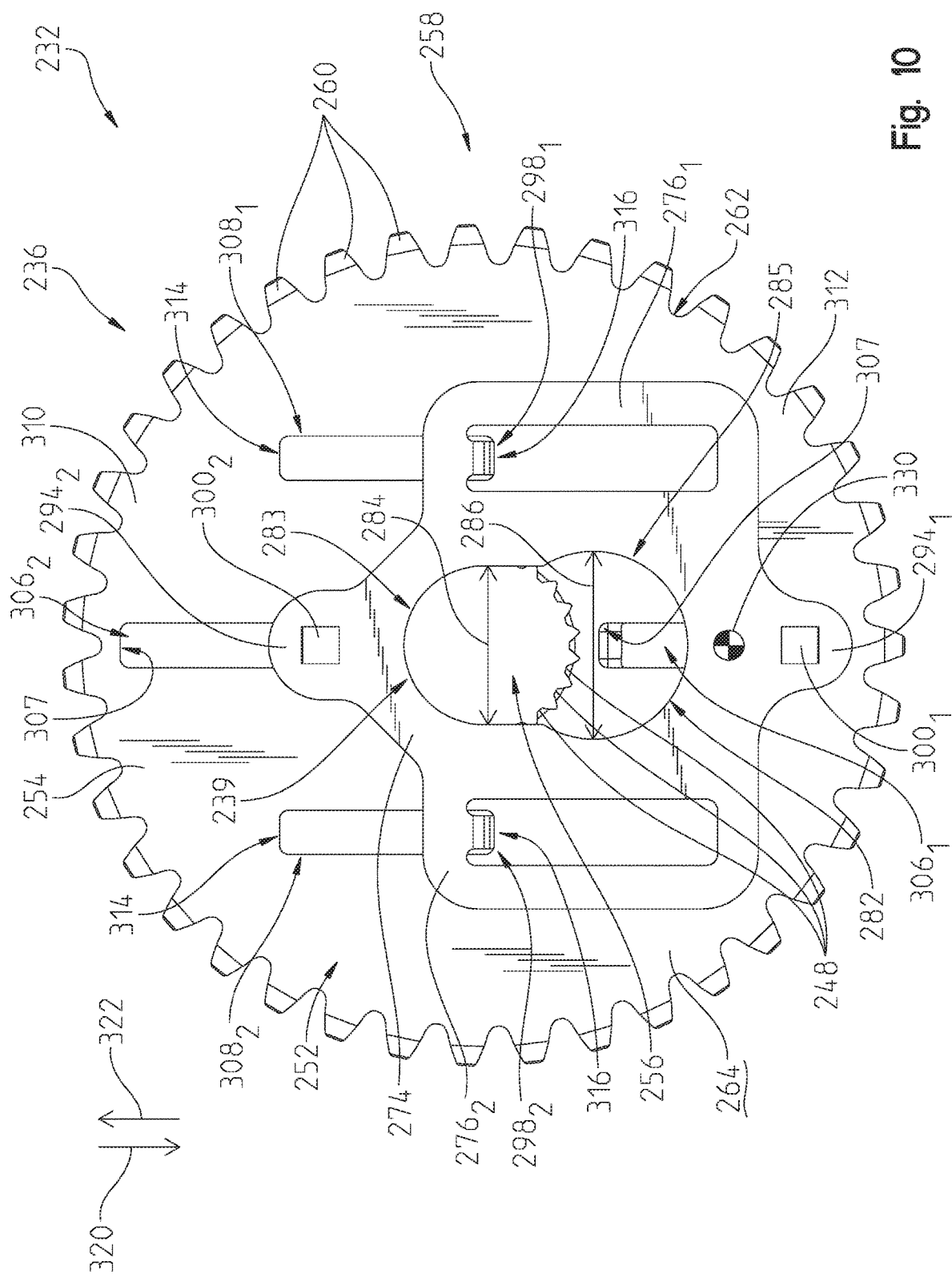
FIG. 10 is a front view of the retainer supported on the profiled wheel in a lock position.
Figure 11:
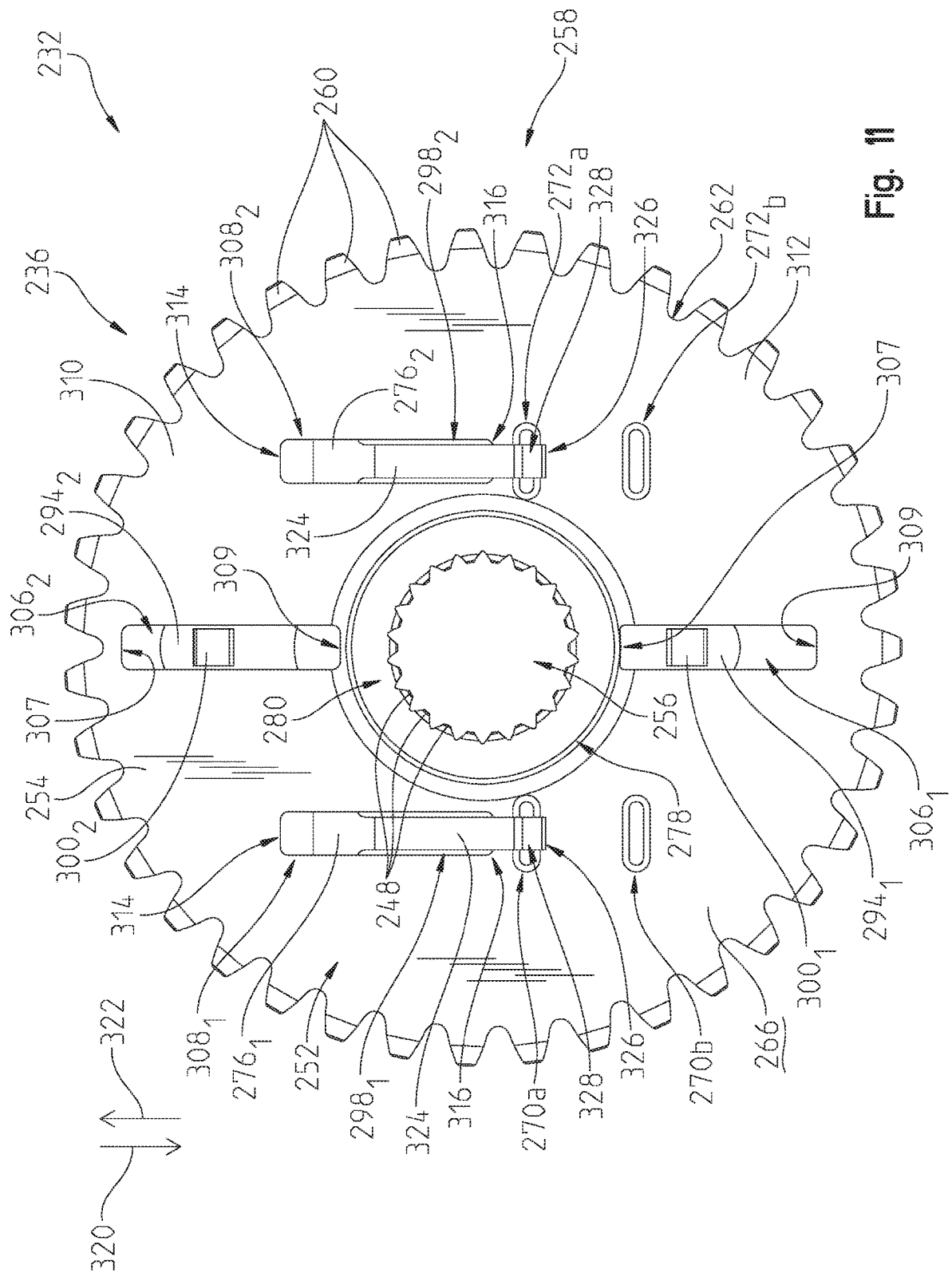
FIG. 11 is a rear view of the retainer supported on the profiled wheel in the release position of FIG. 9.
Figure 12:
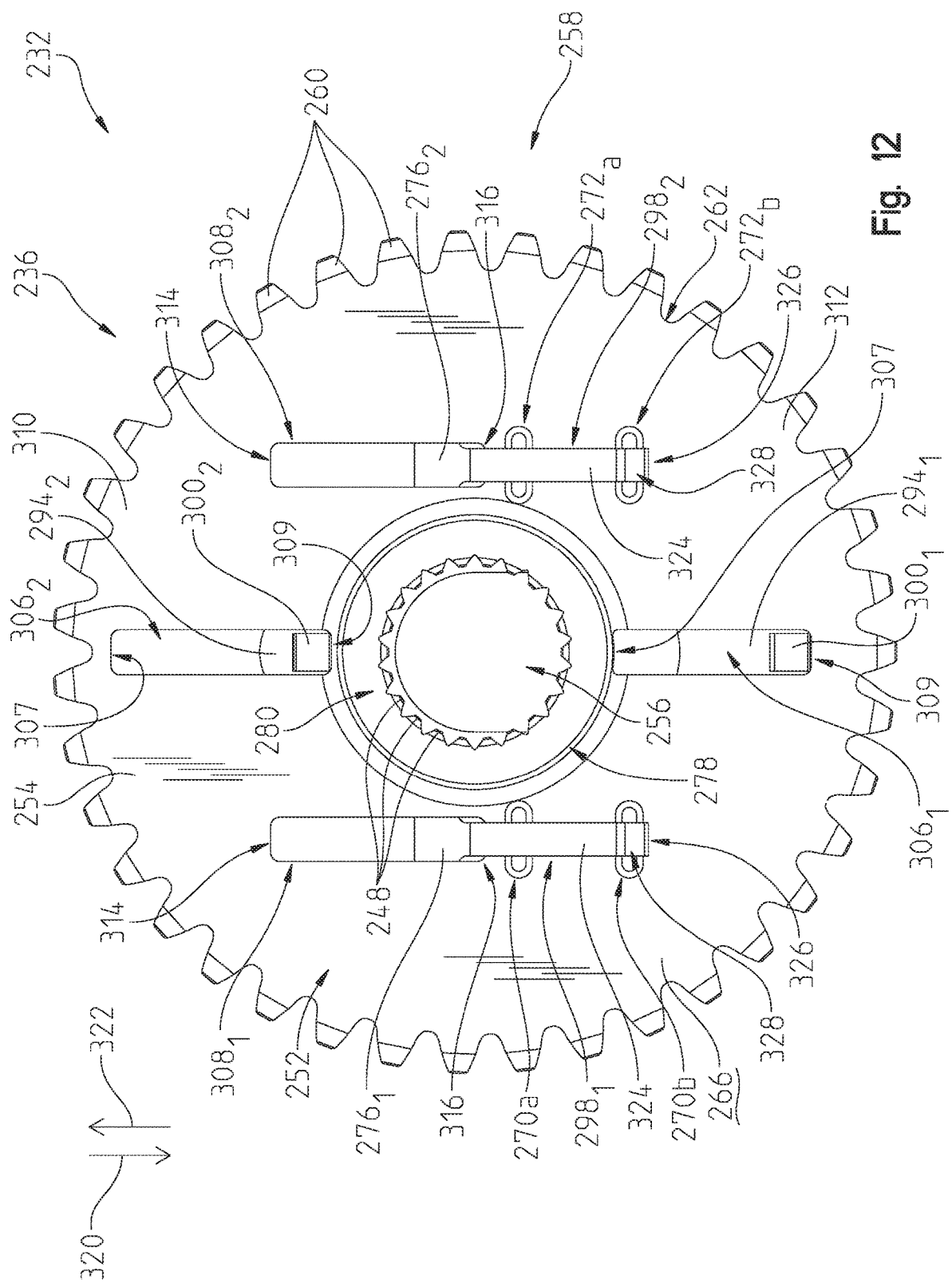
FIG. 12 is a rear view of the retainer supported on the profiled wheel in the lock position of FIG. 10.

Referring now to FIGS. 7 and 9-12, guide prongs 300 are configured to guide retainer 238 along first side 264 of wheel 236 between the release position (FIGS. 9 and 11) and the lock position (FIGS. 10 and 12). Accordingly, guide prongs 300 are received in a respective one of guide slots 306. More specifically, guide prong $300_1$ is received in guide slot $306_1$, and guide prong $300_2$ is received in guide slot $306_2$. When retainer 238 is displaced from the release position toward the lock position in a direction 320 or from the lock position toward the release position in a direction 322 opposite direction 320, guide prongs 300 and guide slots 306 cooperate to maintain the orientation of guide tabs 294 and wings 276 of retainer 238 relative to profiled wheel 236 and, therefore, guide retainer 238 along first side 264 of profiled wheel 236. Directions 320, 322 are angled relative to longitudinal axis 243 of shaft 234. In the exemplary embodiment shown, directions 320, 322 are perpendicular to longitudinal axis 243 of shaft 234.

Similarly, retainer locators 298 are configured to releasably secure retainer 238 to profiled wheel 236 and to cooperate with locators 270, 272 to releasably secure retainer 238 in the release and lock positions. Accordingly, retainer locators 298 are received in respective one of assembly slots 308. More specifically, retainer locator $298_1$ is received in assembly slot $308_1$, and retainer locator $298_2$ is received in assembly slot $308_2$.

In the exemplary embodiment shown, retainer locators 298 comprise a spring tab or clip retaining retainer 238 on profiled wheel 236. Retainer locators 298 extend from first side 264 of body 254 to second side 266 of body 254 and releasably secure retainer 238 to profiled wheel 236 using a clipping or biasing force. More specifically, retainer locators 298 comprise a leg 324 extending from base 274 of retainer 238 to a distal end 326. Distal end 326 of retainer locators 298 releasably engages second side 266 of body 254 to releasably secure retainer 238 to profiled wheel 236. When retainer 238 is assembled on profiled wheel 236, a thickness of body 254 of profiled wheel 236 forces distal end 326 of leg 324 away from base 274 of retainer 238 which results in torsion within leg 324. The torsion within leg 324 of retainer locators 298 forces distal end 326 towards and against second side 266 of body 254. As a result, retainer locators 298 releasably secure retainer 238 to profiled wheel 236.

Referring back to FIG. 5, distal end 326 includes a crimp 328 configured to releasably engage second side 266 of body 254 and locators 270, 272. In other embodiments, distal end 326 of retainer locators 298 comprise a protrusion or a latch configured to releasably engage locators 270, 272. In another embodiment where locators 270, 272 comprise a protrusion, distal end 326 comprises a detent configured to releasably engage the protrusion of locators 270, 272. In another embodiment, retainer 238 is supported for movement along a same side of profiled wheel 236 as locators 270, 272.

Referring now to FIGS. 9-12, retainer 238 is shown in both the release position and the lock position relative to profiled wheel 236 and shaft 234 (see also FIGS. 3a and 3b). Referring specifically to FIGS. 3b, 9, and 11, retainer 238 is shown in the release position in which profiled wheel 236 is axially removable from shaft 234. In the release position, first portion 283 of elongated aperture 282 of retainer 238 is aligned with central aperture 256 of profiled wheel 236 and distal ends 326 of retainer locators 298 releasably engage a respective one of locators 270a, 272a. More specifically, distal end 326 of retainer locator $298_1$ releasably engages locator 270a, and distal end 326 of retainer locator $298_2$ releasably engages locator 272a. In addition, guide prongs 300 are illustratively positioned intermediate ends 307, 309 of guide slots 306. Because first portion 283 of elongated aperture 282 of retainer 238 is aligned with central aperture 256 of profiled wheel 236, portion 239 of retainer 238 is not received in groove 250 of shaft 234. Therefore, profiled wheel 236 is axially removable from shaft 234.

In the lock position shown in FIGS. 3a, 10, and 12, retainer 238 has been selectively displaced in direction 320 from the release position to the lock position. In the lock position, second portion 285 of elongated aperture 282 of retainer 238 is aligned with central aperture 256 of profiled wheel 236 and distal ends 326 of retainer locations 298 releasably engage a respective one of locators 270b, 272b. More specifically, distal end 326 of retainer locator $298_1$ releasably engages locator 270b, and distal end 326 of retainer locator $298_2$ releasably engages locator 272b. In addition, guide prongs 300 are illustratively positioned closer to second end 309 of guide slots 306 than first end 307 of guide slots 306. Because second portion 285 of elongated aperture 282 of retainer 238 is aligned with central aperture 256 of profiled wheel 236, portion 239 of retainer 238 is received in groove 250 of shaft 234 to axially retain profiled wheel 236 on shaft 234 (see FIG. 3a). Furthermore, a center of mass 330 of retainer 238 is positioned such that center of mass 330 is spaced about from longitudinal axis 243 of shaft 234 when profiled wheel 236 is positioned on shaft 234. More specifically, center of mass 330 is positioned closer to outer perimeter 262 of profiled wheel 236 than central aperture 256 of profiled wheel 236 when retainer 238 is in the lock position. An advantage, among others, of spacing center of mass 330 of retainer 238 apart from longitudinal axis 243 and closer to outer perimeter 262 of profiled wheel 236 is that the rotation of profiled wheel 236 about longitudinal axis 243 will bias retainer 238 toward the lock position and maintain portion 239 engaged in groove 250 of shaft 234.

In one embodiment shown, a tool is used to selectively displace retainer 238 between the release and lock positions in directions 320, 322. The tool may be any blunt nosed common metallic tool that extends the reach of, for example, an assembler or a mechanic. In one embodiment, the tool is a flat-head screwdriver having a six inch shaft. In other embodiments, a user selectively displaces retainer 238 between the release and lock positions. An advantage, among others, of supporting retainer 238 on profiled wheel 236 is that profiled wheel 236 may be installed and removed from shaft 234 in transmission 100 when gap 228 is too small to allow access to, for example, a snap ring or other retainer.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-speed transmission, comprising:
an input member;
an output member driven by the input member;
a plurality of gears positionable to provide a plurality of gear ratios of the output member relative to the input member;
a profiled wheel having a disk-shaped body and engagement features extending radially outwardly from an outer perimeter of the body, the body including an aperture and a first profiled wheel locator spaced apart from a second profiled wheel locator, the body of the profiled wheel including a first side and a second side opposite the first side, the first and second profiled wheel locators positioned on the second side of the body of the profiled wheel;
a shaft received by the aperture of the profiled wheel, the profiled wheel being removably coupled to the shaft for rotation with the shaft; and
a retainer supported for movement along a first side of the body of the profiled wheel, the retainer including a base and a first retainer locator extending from the base, the first retainer locator extending from the first side of the body to the second side of the body of the profiled wheel,
the retainer selectively moveable along the first side between a release position relative to the profiled wheel in which the base of the retainer is disengaged from the shaft and a lock position relative to the profiled wheel in which a portion of the base of the retainer engages the shaft to axially lock the profiled wheel on the shaft and
the first retainer locator cooperates with the first profiled wheel locator to hold the retainer in the lock position and the first retainer locator cooperates with the second profiled wheel locator to hold the retainer in the release position, the first retainer locator being positioned on the second side of the body of the profiled wheel when the retainer is in the release position and when the retainer is in the lock position.

2. The multi-speed transmission of claim 1, wherein the retainer is moveable relative to the profiled wheel in a first direction as the retainer moves from the release position to the lock position, the first direction being angled relative to a rotational axis of the shaft.

3. The multi-speed transmission of claim 1, wherein the first retainer locator is a spring tab.

4. The multi-speed transmission of claim 1, wherein the shaft includes a circumferential groove configured to receive the portion of the base of the retainer when the retainer is in the lock position.

5. The multi-speed transmission of claim 4, wherein a center of mass of the base of the retainer is positioned closer to the outer perimeter than the aperture of the body of the profiled wheel when the retainer is in the lock position, the center of mass positioned so that the retainer is biased toward the lock position when the shaft and the profiled wheel are rotating together.

6. The multi-speed transmission of claim 1, wherein:
the body of the profiled wheel further includes a third profiled wheel locator spaced apart from a fourth profiled wheel locator; and
the retainer further includes a second retainer locator extending from the base, wherein the second retainer locator releasably engages the third profiled wheel locator when the retainer is in the release position and cooperates with the fourth profiled wheel locator when the retainer is in the lock position.

7. The multi-speed transmission of claim 6, wherein the third and fourth profiled wheel locators are located on the second side of the body of the profiled wheel and the second retainer locator extends parallel to the first retainer locator.

8. The multi-speed transmission of claim 1, wherein the profiled wheel is a sprocket.

9. The multi-seed transmission of claim 1, further comprising a housing and a motor supported within the housing, the shaft extending from the motor.

10. The multi-speed transmission of claim 9, wherein the profiled wheel is positioned intermediate a wall of the housing and the motor.

11. A profiled wheel assembly for coupling to a shaft, comprising:
a profiled wheel including a body with a central aperture and engagement features extending radially outwardly from an outer perimeter of the body, a first guide slot extending radially outwardly from the aperture, and a first assembly slot spaced apart from and parallel to the first guide slot; and
a retainer supportable by the profiled wheel, the retainer being positionable relative to the profiled wheel in a lock position wherein the retainer axially locks the profiled wheel relative to the shaft and a release position wherein the retainer axially unlocks the profiled wheel relative to the shaft, the retainer including a base supported for movement along a first side of the body of the profiled wheel and a plurality of arms coupled to the base of the retainer and engageable with a second side of the profiled wheel to hold the retainer in at least one of the lock position and the release position.

12. The profiled wheel assembly of claim 11, wherein the second side of the profiled wheel includes a first profiled wheel locator spaced apart from a second profiled wheel locator, the second side opposite the first side, and wherein a first one of the plurality of arms extends from the first side to the second side and cooperates with the first profiled wheel locator when the retainer is in the release position and cooperates with the second profiled wheel locator when the retainer is in the lock position.

13. The profiled wheel assembly of claim 12, wherein the first assembly slot overlaps at least a portion of the central aperture, the first assembly slot and the first guide slot positioned on a first portion of the body and the second profiled wheel locator positioned on a second portion of the body.

14. The profiled wheel assembly of claim 13, wherein the first assembly slot extends from a first end to a second end, the first profiled wheel locator positioned proximate the second end of the first assembly slot.

15. The profiled wheel assembly of claim 11, wherein the body of the profiled wheel includes a collar extending outwardly from a second side of the body, the second side opposite the first side, the collar surrounding and coaxial with the aperture, the collar and aperture including engagement features.

16. The profiled wheel assembly of claim 15, wherein the engagement features of the collar and aperture are splines extending from the first side of the body to a distal end of the collar.

17. The profiled wheel assembly of claim 11, wherein retainer further includes a first guide prong extending from the base, the first guide prong extending parallel to the plurality of arms and received in the first guide slot.

18. The profiled wheel assembly of claim 17, wherein the body of the profiled wheel further includes a second guide slot extending radially outwardly from the aperture, and the retainer further includes a second guide prong extending from the base and received in the second guide slot, the first and second guide prongs configured to guide the retainer along the first side of the body of the profiled wheel from the release position to the lock position.

19. The profiled wheel assembly of claim 11, wherein the body of the profiled wheel further includes a second assembly slot extending parallel to the first assembly slot, and a second one of the plurality of arms is received in the second assembly slot.

20. A profiled wheel assembly for coupling to a shaft, comprising:
a profiled wheel having a disk-shaped body and engagement features extending radially outwardly from an outer perimeter of the body, the body including an aperture and a first profiled wheel locator spaced apart from a second profiled wheel locator, the body of the profiled wheel including a first side and a second side opposite the first side, the first and second profiled wheel locators positioned on the second side of the body; and
a retainer supported for movement along the first side of the body of the profiled wheel, the retainer including a base and a first retainer locator extending from the base, the first retainer locator extending from the first side of the body to the second side of the body of the profiled wheel,
the retainer being positionable relative to the profiled wheel in a lock position wherein the retainer axially locks the profiled wheel relative to the shaft and the first retainer locator cooperates with the first profiled wheel locator to hold the retainer in the lock position and
a release position wherein the retainer axially unlocks the profiled wheel relative to the shaft and the first retainer locator cooperates with the second profiled wheel locator to hold the retainer in the release position.

21. The profiled wheel assembly of claim 20, wherein each of the first and second profiled wheel locators comprise an indent in a surface of the body of the profiled wheel.

22. The profiled wheel assembly of claim 20, wherein:
the base of the retainer has an elongated aperture with a first diameter and a second diameter larger than the first diameter;
the retainer comprises a first guide prong extending from the base and collinear with the elongated aperture of the base; and
the first retainer locator comprises a plurality of arms extending from the base, the plurality of arms positioned parallel to the first guide prong and the elongated aperture.

23. The profiled wheel assembly of claim 22, wherein the retainer further comprises a second guide prong extending from the base and collinear with the first guide prong.

24. The profiled wheel assembly of claim 22, wherein the first guide prong and the plurality of arms extend from the base generally in a first direction.

25. The profiled wheel assembly of claim 22, wherein the first guide prong extends upwardly from the base to a first height relative to the base, and each of the plurality of arms extends upwardly from the base to a second height relative to the base, the second height greater than the first height.

26. The profiled wheel assembly of claim 22, wherein a first one of the plurality of arms is positioned on first side of the elongated aperture and a second one of the plurality of arms is positioned on a second side of the elongated aperture and parallel to the first one of the plurality of arms, the second side of the aperture opposite the first side of the aperture.

27. The profiled wheel assembly of claim 26, wherein the plurality of arms is two.

28. The profiled wheel assembly of claim 20, wherein:
the outer perimeter extends from the first side to the second side of the profiled wheel.

29. The profiled wheel assembly of claim 20, wherein the engagement features of the profiled wheel comprise one of cogs configured to engage a belt and teeth configured to engage complementary gear teeth.

* * * * *

UNITED STATES PATENT AND TRADEMARK OFFICE
CERTIFICATE OF CORRECTION

| | |
|---|---|
| PATENT NO. | : 11,519,464 B2 |
| APPLICATION NO. | : 16/442764 |
| DATED | : December 6, 2022 |
| INVENTOR(S) | : James Raszkowski and William S. Reed |

It is certified that error appears in the above-identified patent and that said Letters Patent is hereby corrected as shown below:

In the Claims

Claim 9, Column 12, Line 48 please replace "multi-seed" with "multi-speed"

Signed and Sealed this
Fifth Day of November, 2024

Katherine Kelly Vidal
*Director of the United States Patent and Trademark Office*